United States Patent
Uhlenbrock et al.

(10) Patent No.: US 11,423,651 B2
(45) Date of Patent: Aug. 23, 2022

(54) SYSTEM AND METHOD FOR THE FUSION OF BOTTOM-UP WHOLE-IMAGE FEATURES AND TOP-DOWN ENTTIY CLASSIFICATION FOR ACCURATE IMAGE/VIDEO SCENE CLASSIFICATION

(71) Applicant: HRL Laboratories, LLC, Malibu, CA (US)

(72) Inventors: Ryan M. Uhlenbrock, Calabasas, CA (US); Deepak Khosla, Camarillo, CA (US); Yang Chen, Westlake Village, CA (US); Fredy Monterroza, Canoga Park, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 245 days.

(21) Appl. No.: 15/427,597

(22) Filed: Feb. 8, 2017

(65) Prior Publication Data

US 2019/0005330 A1 Jan. 3, 2019

Related U.S. Application Data

(60) Provisional application No. 62/293,321, filed on Feb. 9, 2016.

(51) Int. Cl.
*G06K 9/62* (2022.01)
*G06N 3/04* (2006.01)
(Continued)

(52) U.S. Cl.
CPC .............. *G06V 20/41* (2022.01); *G06K 9/62* (2013.01); *G06K 9/629* (2013.01); *G06K 9/6271* (2013.01);
(Continued)

(58) Field of Classification Search
CPC .......... G06K 9/00718; G06K 9/00771; G06K 9/00624; G06K 9/00684; G06K 9/46;
(Continued)

(56) References Cited

U.S. PATENT DOCUMENTS 8,532,400 B1  9/2013  Babenko et al.
8,885,887 B1  11/2014  Chen et al.
(Continued)

FOREIGN PATENT DOCUMENTS

CN  102622607  *  8/2012  ............... G06K 9/62
CN  102622607 A    8/2012

OTHER PUBLICATIONS

Karpath et al., "Large-scale Video Classification with Convolutional Neural Networks", Jun. 2014, IEEE, 2014 IEEE Conf. on Computer Vision and Pattern Recognition, p. 1725-1732. (Year: 2014).*

(Continued)

*Primary Examiner* — Vincent Rudolph
*Assistant Examiner* — Timothy Choi
(74) *Attorney, Agent, or Firm* — Tope-McKay & Associates (57) ABSTRACT

Described is a system and method for accurate image and/or video scene classification. More specifically, described is a system that makes use of a specialized convolutional-neural network (hereafter CNN) based technique for the fusion of bottom-up whole-image features and top-down entity classification. When the two parallel and independent processing paths are fused, the system provides an accurate classification of the scene as depicted in the image or video.

15 Claims, 6 Drawing Sheets

(51) Int. Cl.
| | |
|---|---|
| *G06V 10/40* | (2022.01) |
| *G06V 10/46* | (2022.01) |
| *G06V 20/00* | (2022.01) |
| *G06N 3/08* | (2006.01) |
| *G06V 10/82* | (2022.01) |
| *G06V 20/40* | (2022.01) |
| *G06T 7/10* | (2017.01) |
| *G06T 1/20* | (2006.01) |
| *G06T 1/60* | (2006.01) |
| *G06N 20/10* | (2019.01) |

(52) U.S. Cl.
CPC ......... *G06K 9/6292* (2013.01); *G06N 3/0454* (2013.01); *G06N 3/08* (2013.01); *G06V 10/40* (2022.01); *G06V 10/464* (2022.01); *G06V 20/00* (2022.01); *G06N 20/10* (2019.01); *G06T 1/20* (2013.01); *G06T 1/60* (2013.01); *G06T 7/10* (2017.01); *G06V 10/82* (2022.01)

(58) Field of Classification Search
CPC ...... G06K 9/4676; G06K 9/62; G06K 9/6271; G06K 9/629; G06K 9/6292; G06K 9/6293; G06T 7/10; G06T 2207/20084; G06T 1/20; G06T 1/60; G06N 3/02; G06N 3/0454; G06N 3/08
See application file for complete search history.

(56) References Cited

U.S. PATENT DOCUMENTS

| | | | |
|---|---|---|---|
| 8,965,115 | B1 | 2/2015 | Khosla et al. |
| 9,008,366 | B1 | 4/2015 | Kim et al. |
| 9,111,355 | B1 | 8/2015 | Honda et al. |
| 9,165,208 | B1 | 10/2015 | Jeong et al. |
| 2006/0018524 | A1 | 1/2006 | Suzuki et al. |
| 2008/0310717 | A1 | 12/2008 | Saathoff et al. |
| 2013/0148881 | A1 | 6/2013 | Xue |
| 2014/0079297 | A1 | 3/2014 | Tadayon et al. |
| 2015/0287211 | A1 | 10/2015 | Mundhenk et al. |
| 2016/0035078 | A1 | 2/2016 | Lin et al. |
| 2016/0140408 | A1* | 5/2016 | Shen .................... G06K 9/4676 382/157 |
| 2016/0140424 | A1* | 5/2016 | Wang ...................... G06K 9/66 382/156 |
| 2017/0228616 | A1* | 8/2017 | Tasdizen .............. G06K 9/6256 |

OTHER PUBLICATIONS

Wang et al., "Object-Scene Convolutional Neural Networks for Event Recognition in Images", Jun. 2015, IEEE, Conf. on Computer Vision and Pattern Recognition Workshops, p. 30-35. (Year: 2015).*
He et al., "Spatial Pyramid Pooling in Deep Convolutional Networks for Visual Recognition" Sep. 2015, IEEE, IEEE Transactions on Pattern Analysis and Machine Intelligence, vol. 37, is. 9, p. 1904-1916. (Year: 2015).*
Dixit et al., "Scene Classification with Semantic Fisher Vectors", Jun. 2015, IEEE, 2015 IEEE Conference on Computer Vision and Pattern Recognition (CVPR), p. 2974-2983. (Year: 2015).*
Xiong et al., "Recognize Complex Events from Static Images by Fusing Deep Channels", Jun. 2015, IEEE, 2015 IEEE Conference on Computer Vision and Pattern Recognition (CVPR), p. 1600-1609. (Year: 2015).*
Notification of Transmittal of International Search Report and the Written Opinion of the International Searching Authority for PCT/US2017/017203; dated Nov. 30, 2017.
International Search Report of the International Searching Authority for PCT/US2017/017203; dated Nov. 30, 2017.
Written Opinion of the International Searching Authority for PCT/US2017/017203; dated Nov. 30, 2017.
Min Fu, Yuan Yuan, Xiaoqiang Lu, "Unsupervised Feature Learning for Scene Classification of High Resolution Remote Sensing Images." IEEE China Summit and International Conference on Signal and Information Processing (ChinaSIP), 2015, pp. 206-210.
Zhen Zuo, Bing Shuai, Gang Wang, Xiao Liu, Xingxing Wang, Bing Wang, and Yushi Chen. "Convolutional Recurrent Neural Networks: Learning Spatial Dependencies for Image Representation." In Proceedings of the Conference on Computer Vision and Pattern Recognition Workshops (CVPRW), IEEE, 2015, pp. 18-26.
B. Zhou, A. Khosla, A. Lapedriza, A. Oliva, and A. Torralba. "Object Detectors Emerge in Deep Scene CNNs." International Conference on Learning Representations (ICLR) oral, 2015, pp. 1-12.
Deepak Khosla, Yang Chen, K. Kim, "A Neuromorphic System for Video Object Recognition," Frontiers in Computational Neuroscience, 2014; 8: pp. 147-159 (2014).
International Preliminary Report on Patentability for PCT/US2017/017203; dated Apr. 16, 2018.
Communication pursuant to Rules 70(2) and 70a(2) EPC, Supplementary European search Report, for the application tor European Regional Phase Patent Application No. 17792965.0, dated Aug. 21, 2019.
Bogdan Miclut, et al: "Committees of Deep Feedforward Networks Trained with Few Data," In: "Serious Games," Jun. 23, 2014 (Jun. 23, 2014), Springer International Publishing, pp. 1-7.
Fan Hu, et al: "Transferring Deep Convolutional Neural Networks for the Scene Classification of High-Resolution Remote Sensing Imagery," Remote Sensing, vol. 7, No. 11, Nov. 5, 2015 (Nov. 5, 2015), pp. 14680-14707.
Wolpert D H Ed—Roy Asim, et al: "Stacked Generalization," Neural Networks, Elsevier Science Publishers, Barking, GB, vol. 5, No. 2, Jan. 1, 1992 (Jan. 1, 1992), pp. 241-259.
Office Action 1 for Chinese Application No. 201780005905.X, dated Mar. 3, 2021 (Original).
Office Action 1 for Chinese Application No. 201780005905.X, dated Mar. 3, 2021 (English translation).
Fan Hu, et al., "Transferring deep convolutional neural networks for the scene classification of high-resolution remote sensing imagery," Remote Sensing, vol. 7, No. 11, pp. 14680-14707.
Response to Office Action 1 for Chinese Application No. 201780005905.X, dated Jul. 19, 2021 (Original).
Amended Claims for Chinese Application No. 201780005905.X, dated Jul. 19, 2021 (English translation).
Office Action 2 for Chinese Application No. 201780005905.X, dated Nov. 24, 2021 (Original).
Office Action 2 for Chinese Application No. 201780005905.X, dated Nov. 24, 2021 (English translation).
Response to communication pursuant to Rules 70(2) and 70a(2) EPC, Supplementary European search Report, for the application for European Regional Phase Patent Application No. 17792965.0, dated Jun. 8, 2020.
Office Action 3 for Chinese Application No. 201780005905.X, dated Feb. 23, 2022 (Original).
Office Action 3 for Chinese Application No. 201780005905.X, dated Feb. 23, 2022 (English translation).
Response to Office Action 3 for Chinese Application No. 201780005905.X, dated Apr. 20, 2022.
Decision of Rejection for Chinese Application No. 201780005905.X, dated May 19, 2022.
English translation of pending claims for Chinese Application No. 201780005905.X, dated May 19, 2022.
Reexamination Request for Chinese Application No. 201780005905.X, dated Jul. 4, 2022.
English translation of proposed claim amendments for Chinese Application No. 201780005905.X, dated Jul. 4, 2022.

* cited by examiner

SYSTEM AND METHOD FOR THE FUSION OF BOTTOM-UP WHOLE-IMAGE FEATURES AND TOP-DOWN ENTITY CLASSIFICATION FOR ACCURATE IMAGE/VIDEO SCENE CLASSIFICATION

STATEMENT REGARDING FEDERAL SPONSORED RESEARCH OR DEVELOPMENT

This invention was made with government support under the U.S. Government's ONR NEMESIS project, Contract Number N00014-15-C-0091. The government has certain rights in the invention.

CROSS-REFERENCE TO RELATED APPLICATIONS

This is a non-provisional patent application of 62/293,321, filed on Feb. 9, 2016, the entirety of which is hereby incorporated by reference.

BACKGROUND OF THE INVENTION

(1) Field of Invention

The present invention relates to a system and method for accurate image and video scene classification and, more specifically, to a system and method that makes use of a specialized convolutional-neural network based technique for the fusion of bottom-up whole-image features and top-down entity classification.

(2) Description of Related Art

Convolutional neural networks (CNN) are the state of the art for entity and scene classification using whole image features on large image datasets. However, existing CNN systems do not explicitly use entity information in tasks where that could be useful. Because the pixels of the entities are in the whole image input to the CNN, entity features can be detected and integrated by later layers, such that the CNN alone to some extent serves as entity detector and whole image feature extractor at once (see the List of Incorporated Literature References, Literature Reference No. 3). This capability is limited when generalizing to scenes with entity relationships different from those seen in the training set.

Modifications to CNN's to learn better spatial relationships between features are making recent advances (see Literature Reference No. 2), which combine a CNN with a recurrent neural network (RNN), by unfolding the image features from a spatial two-dimensional (2-D) domain to a one-dimensional (1-D) time series suitable for a RNN. Because of the flexible structural relationship between entities and scenes, learning these spatial relationships will likely not perform well with an independent entity recognition component. The unfolding is also done in fixed scanning patterns that would be arbitrary in images without a constrained orientation (e.g., as in aerial imagery).

Other methods for scene recognition using features designed by hand (e.g., SURF or HOG) or features from unsupervised learning (see Literature Reference No. 1) are somewhat effective, but generally outperformed by CNN based methods.

Scene classification has been a long-standing topic of interest as made obvious by the listed prior art. The idea of automatically using image data as input and letting the algorithm learn and extract discriminating features via a deep learning method that fuses features and top-down information in a subsequent automated classification is not obvious or has not been applied to this topic. While traditional neural networks have been widely used, these approaches require feature selection that must be done by humans and do not have the feature learning capability of deep learning.

Thus, a continuing need exists for a system that uses image data as input to let an algorithm learn and extract discriminating features via a deep learning method that fuses features and top-down information in a subsequent automated classification.

SUMMARY OF THE INVENTION

This disclosure provides a system for scene classification. In various embodiments, the system includes one or more processors and a memory. The memory is a non-transitory computer-readable medium having executable instructions encoded thereon, such that upon execution of the instructions, the one or more processors perform several operations, including operating at least two parallel, independent processing pipelines on an image or video to generate independent results; fusing the independent results of the at least two parallel, independent processing pipelines to generate a fused scene class; and electronically controlling machine behavior based on the fused scene class of the image or video.

In another aspect, the at least two parallel, independent processing pipelines includes an entity processing pipeline that uses a convolutional neural network (CNN) to identify a number and type of entities in the image or video, resulting in an entity feature space.

In yet another aspect, the entity processing pipeline identifies and segments potential object locations within the image or video and assigns a class label to each identified and segmented potential object within the image or video. In another aspect, the entity feature space includes a bag of words histogram feature.

In yet another aspect, the at least two parallel, independent processing pipelines includes a whole image processing pipeline that uses a convolutional neural network (CNN) to extract visual features from the whole image, resulting in a visual feature space.

Further, in fusing the independent results to generate the fused scene class, the visual feature space and entity feature space are combined into a single multi-dimensional combined feature, with a classifier trained on the combined feature generating the fused scene class.

In another aspect, in fusing the independent results to generate the fused scene class, two classifiers are trained separately for each of the visual feature space and entity feature space to generate independent class probability distributions over scene types, with the independent class probability distributions being combined to generate the fused scene class.

In yet another aspect, electronically controlling machine behavior includes at least one of labeling data associated with the image or video with the fused scene class, displaying the fused scene class with the image or video, controlling vehicle performance, or controlling processor performance.

In another aspect, the system displays the image or video with a label that includes the fused scene class.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system and method for accurate image and video scene classification and, more specifically, to a system and method that makes use of a specialized convolutional-neural network based technique for the fusion of bottom-up whole-image features and top-down entity classification. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of incorporated references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number.

1. Min Fu, Yuan Yuan, Xiaoqiang Lu, "Unsupervised Feature Learning for Scene Classification of High Resolution Remote Sensing Images." IEEE China Summit and International Conference on Signal and Information Processing (ChinaSIP), 2015.
2. Zhen Zuo, Bing Shuai, Gang Wang, Xiao Liu, Xingxing Wang, Bing Wang, and Yushi Chen. "Convolutional Recurrent Neural Networks: Learning Spatial Dependencies for Image Representation." In Proceedings of the Conference on Computer Vision and Pattern Recognition Workshops (CVPRW), IEEE, 2015.
3. B. Zhou, A. Khosla, A. Lapedriza, A. Oliva, and A. Torralba. "Object Detectors Emerge in Deep Scene CNNs." International Conference on Learning Representations (ICLR) oral, 2015.
4. U.S. Pat. No. 8,885,887, "System for object detection and recognition in videos using stabilization," 2014.
5. U.S. Pat. No. 8,965,115, "Adaptive multi-modal detection and fusion in videos via classification-based-learning," 2015.
6. U.S. Pat. No. 9,008,366, "Bio-inspired method of ground object cueing in airborne motion imagery," 2015.
7. U.S. Pat. No. 9,111,355, "Selective color processing for vision systems that enables optimal detection and recognition," 2015.
8. U.S. Pat. No. 9,165,208, "Robust ground-plane homography estimation using adaptive feature selection," 2015.
9. Deepak Khosla, Yang Chen, K. Kim, A Neuromorphic System for Video Object Recognition, Frontiers in Computational Neuroscience, 2014; 8: 147 (2014).

(2) Principal Aspects

Various embodiments of the present invention include three "principal" aspects. The first is a system and method for accurate image and/or video scene classification and, more specifically, to one that makes use of a specialized convolutional-neural network (CNN) based technique for the fusion of bottom-up whole-image features and top-down entity classification. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
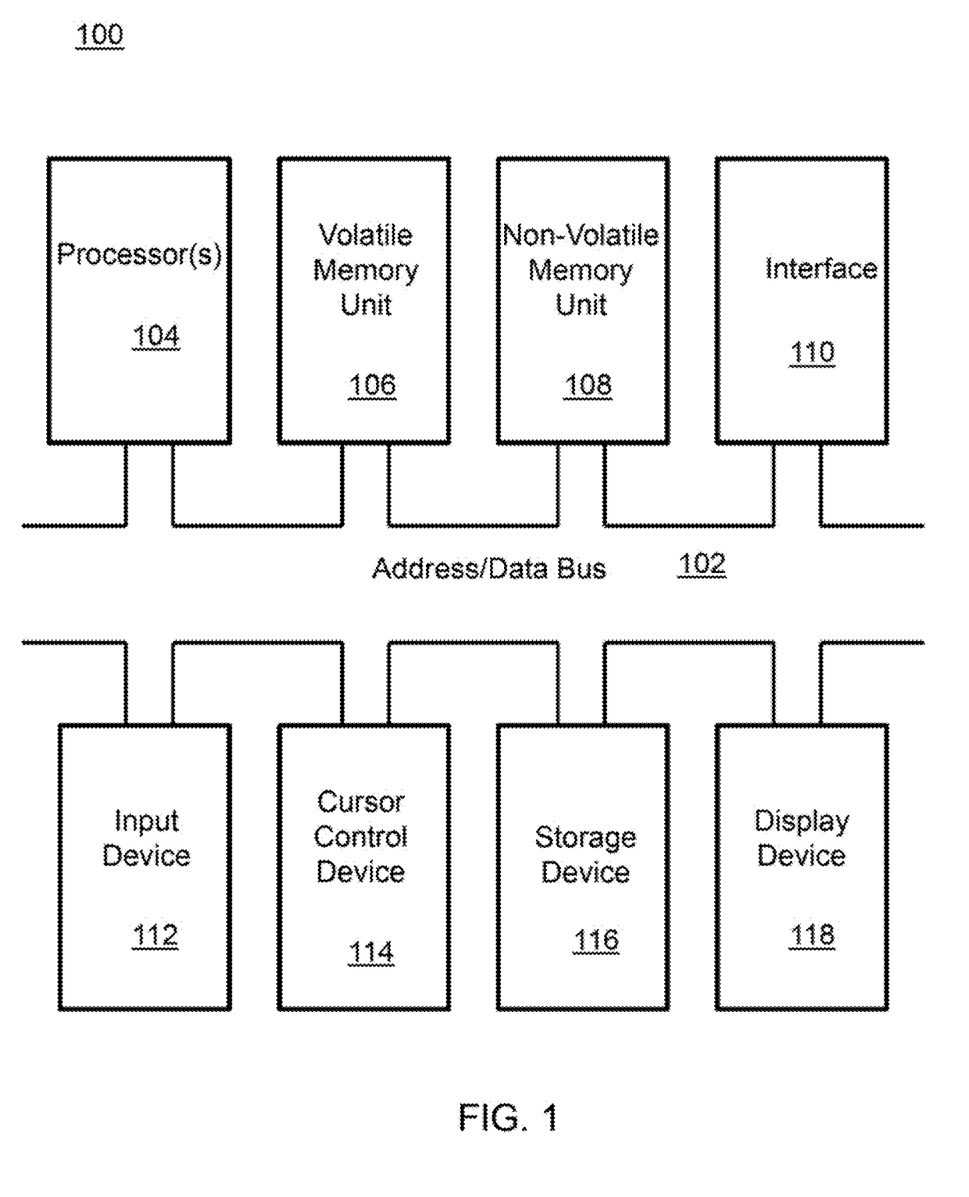
FIG. 1 is a block diagram depicting the components of a system according to various embodiments of the present invention.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
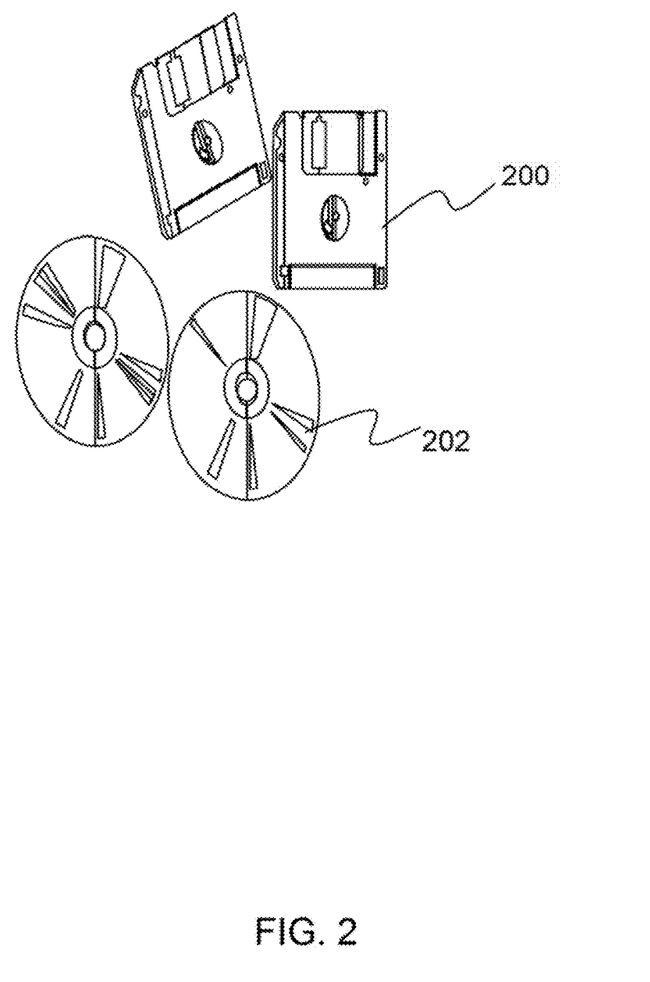
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

This disclosure provides a system for automatically classifying and labeling the scene type depicted in an image or video (e.g., roadways, urban, water-body, vegetation, etc.). A unique aspect of the method employed by the system is in combining information from an entity processing pipeline (top-down information) and a whole image processing pipeline (bottom-up information). The top-down pipeline uses a convolutional neural network (CNN) to identify the number and type of entities in the image. The bottom-up pipeline uses a CNN to extract visual features from the whole image. The entity description from the top-down pipeline is converted into an entity feature space that is combined with the visual feature space. A classifier is trained with supervised learning on the combined feature space and used to produce a scene type label.

Using entity information helps to supplement a CNN when generalizing it to a new task. While CNN's are the state of the art for object classification and scene recognition tasks in computer vision, there are some limitations to their generalizability to image sets other than those they were trained on. Typically, successful CNN's have several (e.g., 5-10) convolutional layers and fully connected neural network layers, thus they have hundreds of thousands to tens of millions of parameters. Assigning values to all these parameters involves training the network in a supervised fashion on very large labelled image datasets. When the image dataset contains a broad enough variety of image classes, the early convolutional layers in the network learn basic image features like edges, which can easily generalize to other image sets, while the later stage layers learn mappings from the midlevel features to the class labels particular to the training set. To take such a pre-trained CNN and apply it to a specific problem (e.g., UAV scouting), the later layers can be removed and a new final layer trained in a smaller supervised training set for the new classification task. Combining the CNN output with information about the entities detected in the image is a way to further adapt the CNN to the new task. For practical applications like autonomous driving or UAV surveillance, entity detection may already be part of the control software architecture and trained for the entities that are the most important for the application. Entities are informative about what scene they occur in. For example, airplanes suggest airfields, cars suggest roads, etc. The entities in a scene can help discriminate scene classes that look similar at the whole-image feature level (e.g., a runway on an airfield versus a lane on a road).

As can be appreciated by those skilled in the art, there are many practical applications for the system as described herein. For example, the system can be employed in autonomous driving wherein entities (such as pedestrians, cyclists, vehicles, etc.) are being detected and the scene classification (e.g., freeway vs. parking lot vs. dirt road) could provide context for various control modes. For example, if the system determines an automobile is on a dirt road, it may automatically adjust the suspension of the vehicle, such as releasing air from the tires or loosening the shocks or suspension. Another application is for scene recognition for UAV surveillance and autonomous vehicles. For example, if a UAV is tasked with tracking a vehicle, it may limit its computing power to tracking only when a scene is determined to be one in which vehicles may be tracked, such as on roadways, whereas when flying over a forest the vehicle tracking operations may be disabled. Other applications include oil and gas exploration, automatic image/video classification for a variety of uses, forensics, etc. Thus, as can be appreciated, there are many applications in which scene classification can be employed by a number of systems. Specific details regarding the system are provided below.

(4) Specific Details of Various Embodiments

The architecture of the system described herein combines information from two parallel, independent processing paths: one for the whole images (bottom-up) and one for the entities (top-down). For clarity, each of the processing paths are described below.

(4.1) Whole-Image Pipeline (Bottom-Up Information)

Figure 3:
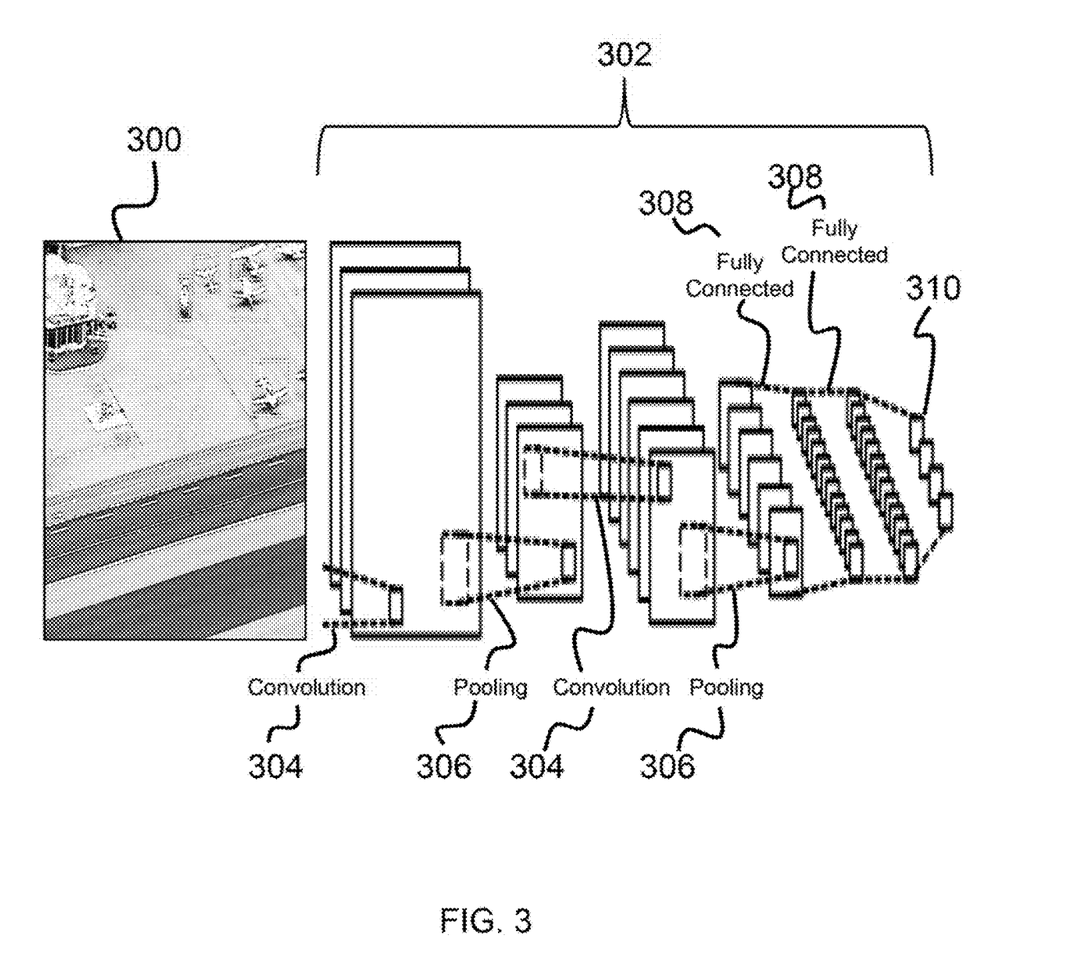
FIG. 3 is an illustration of a whole-image pipeline, wherein convolutional neural network features are extracted from the whole image.
Figure 5:
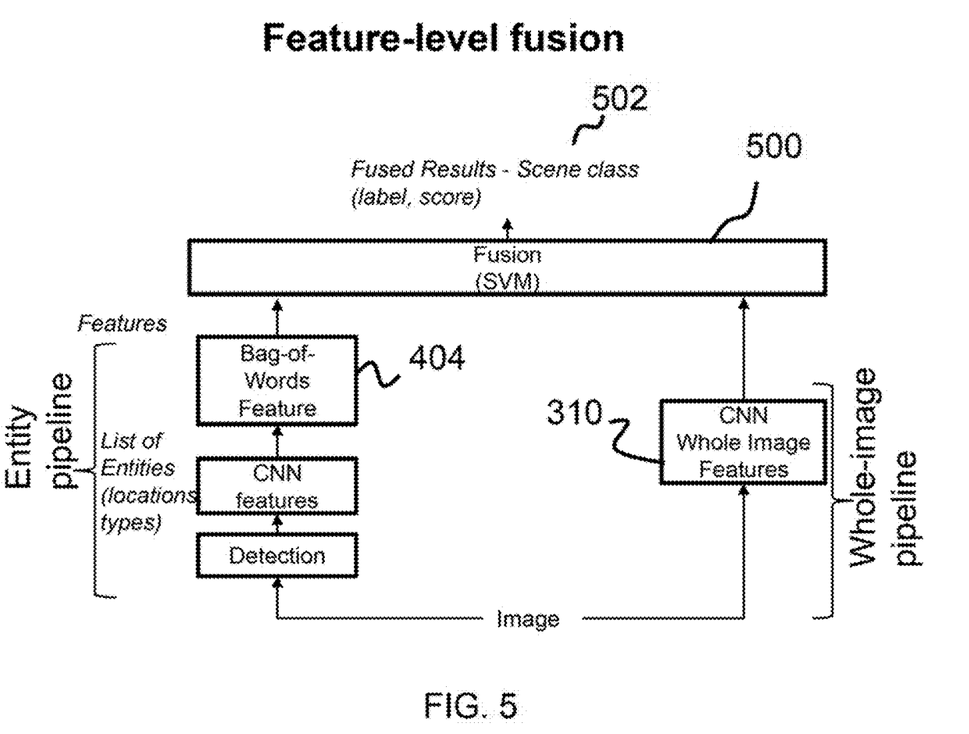
FIG. 5 is an illustration of feature-level fusion.
Figure 6:
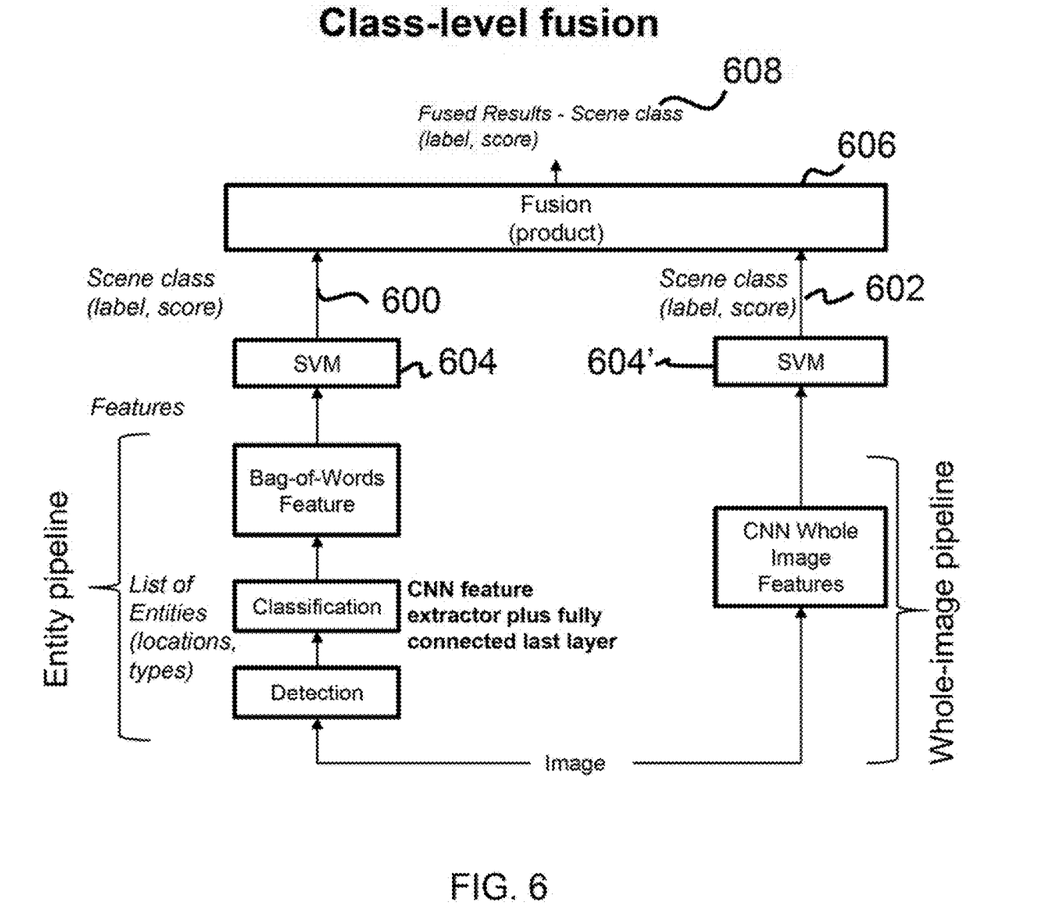
FIG. 6 is an illustration of class-level fusion.

In the whole-image pipeline and as shown in FIG. 3, a whole image 300 is used to extract whole image features 310. The extracted whole image features 310 are extracted with a deep convolutional neural network (CNN) 302. The deep CNN 302 is formed of several layers performing filter convolution 304, spatial pooling 306, and nonlinear rectification. The "fully connected" layers 308 are a type of convolution layer that are usually placed at the end of the network. Rectification is not explicitly drawn in the figure, as it is a simple function applied on a per-element basis after each pooling layer. The network 302 has been trained by supervised learning on a large image dataset with class labels. The class labels used in training the network do not have to correspond to the classes of scenes to be classified by the whole architecture, as it is expected that most of the earlier parts of the network are learning generalizable, low-level visual features. The final layer of the network that assigns a class label to the final feature space can be replaced with another classifier that is later trained on the scene classes. For example, this last layer can be replaced with a linear support vector machine or any other suitable classifier. A class label is generated from the extracted features 310 either via 500 (in combination with 404 and as shown in FIG. 5) in feature-level fusion or via 604 in class-level fusion (as shown in FIG. 6).

For further understanding, upon receiving a whole image 300 (from a sensor (e.g., camera), database, video stream, etc.), the system performs convolution 302 by convolving the image 300 with various filters. Each filter convolution generates a 2D "image" of network activations. Pooling 304 is then performed on those images of activations, resulting in smaller images. A rectification function is applied at each element of the pooled images. The rectified activations can then be in the input to the next convolution layer and so on. After some number of these convolution-pooling-rectification stages, the activations are input to a fully-connected layer 308, a type of neural network layer where each output is a function of all the inputs. It can be thought of also as a convolution layer with filters the same size as the input. One or two fully-connected layers 308 are typically used at the end of the convolutional neural network. The output of the final fully-connected layer 308 is the extracted feature 310.

(4.2) Entity Pipeline (Top-Down Information).

Figure 4:
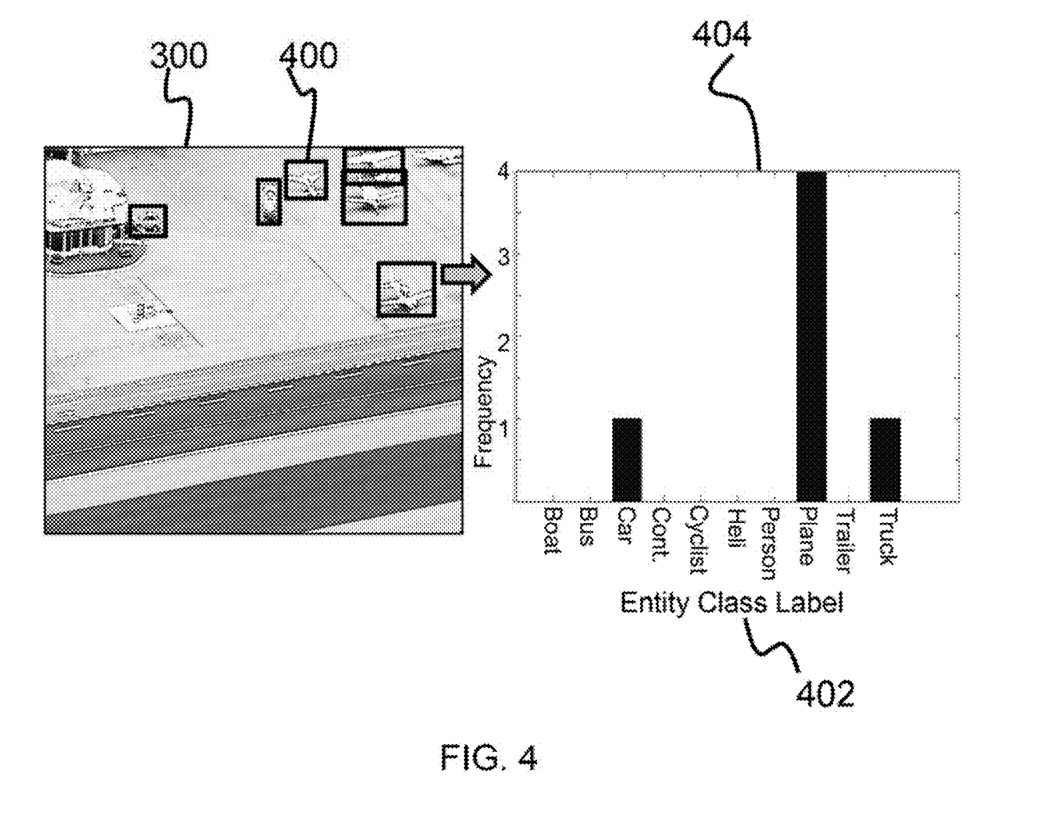
FIG. 4 is an illustration of an entity pipeline, wherein entities are detected and classified using the Neovision2 method, and the entity class/frequency of occurrence is encoded as a bag-of-word histogram.

As shown in FIG. 4, the entity processing pipeline scans the image 300, identifies and segments potential object locations 400, and assigns an entity class label 402 to each potential object. The entity classifier can also be a CNN whose last layer has been trained on the entity types of interest. A non-limiting example of such an entity processing pipeline was described by the inventors in Literature Reference Nos. 4 through 9, which are incorporated herein by reference. Thus, for each image 300, the entity processing pipeline produces a list of all entities in the image and their types (i.e., class labels 402). In one example embodiment, this is encoded into a bag-of-words histogram feature 404. This feature 404 has a number of dimensions equal to the number of entity classes, and the value at each dimension is the frequency (number) of such entities detected.

Other embodiments that encode both the spatial and frequency information are also possible. For example, in another embodiment, the image can be divided into N grids and the bag-of-words histogram can be generated for each grid. The information from all grids is then combined by concatenating each grid bag-of-words into a single bag-of-word histogram. This preserves spatial information that can be helpful in scene classification. For example, with a fixed camera orientation such as in autonomous driving, roads are at the bottom of the scene, then vehicles/pedestrians/street signs, then trees, then horizon/sky is at the top. This spatial structure is encoded in such an embodiment and can be used in scene classification.

(4.3) Fusion

As noted above, the two processing paths run in parallel. The information from the two processing paths is fused either at the feature level or at the class probability level.

In feature-level fusion and as shown in FIG. 5, the two feature spaces are simply concatenated. For example, the whole image features 310 (e.g., a 4096-dimensional image feature vector) and bag-of-words features 404 (e.g., a 10-dimensional entity bag-of-words feature) are combined into one multi-dimensional feature 500 (e.g., a 4106-dimensional feature). Then a classifier (e.g., support vector machine, etc.) is trained on the combined feature space 500 to generate the resulting fused scene class 502 (which includes the class label and score (i.e., probability)). In other embodiments, weighted or biased fusion of these features can be done.

In class-level fusion and as shown in FIG. 6, information is combined at the class probability level such that the scene class 600 from the entity pipeline is fused with the scene class 602 from the whole image pipeline. More specifically, two classifiers 604 and 604' are trained separately for the entities and whole image features. Each classifier 604 and 604' produces a class probability distribution over the scene types (i.e., scene classes 600 and 602). These distributions are combined 606 (e.g., multiplied and renormalized) to produce the final classifier result 608 (fused scene class).

Based on the fused scene class, a number of actions can be taken by the associated system. For example, the system can electronically control machine behavior based on the fused scene class of the image or video, such as labeling data associated with the image or video with the fused scene class, displaying the fused scene class with the image or video, controlling vehicle performance (such as causing a mobile platform (e.g., vehicle, drone, UAV, etc.) to move or maneuver to or away from an identified scene class (such as away from a building, or to a person, etc.)), or controlling processor performance (e.g., increasing processing speed when the class is a busy road, yet decrease speed when the class is an open ocean to conserve processing capacity and power, etc.). As another example, the system can be caused to display the image or video (on a display) with a label that includes the fused scene class.

(4.4) Reduction-to-Practice

To demonstrate the effectiveness of the system described herein, the present invention has been reduced to practice and used to evaluate a dataset that provides both scene labels and entity labels as ground truth. First was the University of Southern California heli dataset, which is a set of aerial videos of Los Angeles. Entities were ground truth labelled at the frame level for 10 classes, as follows: boat, bus, car, container, cyclist, helicopter, person, plane, tractor-trailer, and truck. Images were given scene labels from the classes as follows: airfield, beach, industrial, natural, ocean, roads, and urban. In this example, images with a mixture of scenes or transitioning between scenes were not used. Note that while the entity ground-truth was used for this evaluation, the system can employed just as easily using the Neovision2 processing results of entity detection/classification (see Literature Reference Nos. 4-9). The main reason for using ground-truth is that it is generally more accurate than the Neovision2 results and a desired purpose of the present invention is to show the benefits of fusing the entity information with whole image features.

Four methods of scene classification were compared, as follows: entities only, CNN features only, feature-level fusion, and class-level fusion. These methods achieved mean test classification accuracies of 50.4%, 65.7%, 82.2%, and 83.0%, respectively. This shows the benefit of fusion of the two pipelines for scene classification.

Finally, while the present invention has been described in terms of several embodiments, one of ordinary skill in the art will readily recognize that the present invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for scene classification, the system comprising:
 one or more processors and a memory, the memory being a non-transitory computer-readable medium having executable instructions encoded thereon, such that upon execution of the instructions, the one or more processors perform operations of:
  operating at least two parallel, independent processing pipelines on a whole image to generate independent results, wherein the at least two parallel, independent processing pipelines includes both an entity processing pipeline and a whole image processing pipeline, wherein the entity processing pipeline operates on the whole image and uses a convolutional neural network (CNN) which scans the whole image to identify a number and type of entities in the whole image, resulting in an entity feature space, and wherein the whole image processing pipeline uses a CNN to extract visual features from the whole image, resulting in a visual feature space; and fusing the independent results of the entity and whole image processing pipelines to generate a fused scene class, such that in fusing the independent results to generate the fused scene class, two classifiers are trained separately for each of the visual feature space and entity feature space to generate independent class probability distributions over scene types, with the independent class probability distributions being multiplied and renormalized to generate the fused scene class; and electronically controlling machine behavior based on the fused scene class of the whole image.

2. The system as set forth in claim 1, wherein the entity processing pipeline identifies and segments potential object locations within the image or video and assigns a class label to each identified and segmented potential object within the image or video.

3. The system as set forth in claim 1, wherein the entity feature space includes a bag of words histogram feature.

4. The system as set forth in claim 1, wherein electronically controlling machine behavior includes at least one of labeling data associated with the image or video with the fused scene class, displaying the fused scene class with the image or video, controlling vehicle performance, or controlling processor performance.

5. The system as set forth in claim 1, further comprising an operation of displaying the image or video with a label that includes the fused scene class.

6. A computer program product for scene classification, the computer program product comprising:
   a non-transitory computer-readable medium having executable instructions encoded thereon, such that upon execution of the instructions by one or more processors, the one or more processors perform operations of:
      operating at least two parallel, independent processing pipelines on a whole image to generate independent results, wherein the at least two parallel, independent processing pipelines includes both an entity processing pipeline and a whole image processing pipeline, wherein the entity processing pipeline operates on the whole image and uses a convolutional neural network (CNN) which scans the whole image to identify a number and type of entities in the whole image, resulting in an entity feature space, and wherein the whole image processing pipeline uses a CNN to extract visual features from the whole image, resulting in a visual feature space; and
      fusing the independent results of the entity and whole image processing pipelines to generate a fused scene class, such that in fusing the independent results to generate the fused scene class, two classifiers are trained separately for each of the visual feature space and entity feature space to generate independent class probability distributions over scene types, with the independent class probability distributions being multiplied and renormalized to generate the fused scene class; and
      electronically controlling machine behavior based on the fused scene class of the whole image.

7. The computer program product as set forth in claim 6, wherein the entity processing pipeline identifies and segments potential object locations within the image or video and assigns a class label to each identified and segmented potential object within the image or video.

8. The computer program product as set forth in claim 6, wherein the entity feature space includes a bag of words histogram feature.

9. The computer program product as set forth in claim 6, wherein electronically controlling machine behavior includes at least one of labeling data associated with the image or video with the fused scene class, displaying the fused scene class with the image or video, controlling vehicle performance, or controlling processor performance.

10. The computer program product as set forth in claim 6, further comprising an operation of displaying the image or video with a label that includes the fused scene class.

11. A computer implemented method for scene classification, the method comprising an act of:
    causing one or more processors to execute instructions encoded on a non-transitory computer-readable medium, such that upon execution, the one or more processors perform operations of:
       operating at least two parallel, independent processing pipelines on a whole image to generate independent results, wherein the at least two parallel, independent processing pipelines includes both an entity processing pipeline and a whole image processing pipeline, wherein the entity processing pipeline operates on the whole image and uses a convolutional neural network (CNN) which scans the whole image to identify a number and type of entities in the whole image, resulting in an entity feature space, and wherein the whole image processing pipeline uses a CNN to extract visual features from the whole image, resulting in a visual feature space; and
       fusing the independent results of the entity and whole image processing pipelines to generate a fused scene class, such that in fusing the independent results to generate the fused scene class, two classifiers are trained separately for each of the visual feature space and entity feature space to generate independent class probability distributions over scene types, with the independent class probability distributions being multiplied and renormalized to generate the fused scene class; and
       electronically controlling machine behavior based on the fused scene class of the whole image.

12. The method as set forth in claim 11, wherein the entity processing pipeline identifies and segments potential object locations within the image or video and assigns a class label to each identified and segmented potential object within the image or video.

13. The method as set forth in claim 11, wherein the entity feature space includes a bag of words histogram feature.

14. The method as set forth in claim 11, wherein electronically controlling machine behavior includes at least one of labeling data associated with the image or video with the fused scene class, displaying the fused scene class with the image or video, controlling vehicle performance, or controlling processor performance.

15. The method as set forth in claim 11, further comprising an operation of displaying the image or video with a label that includes the fused scene class.

* * * * *